United States Patent [19]

Cheng

[11] 4,175,884
[45] Nov. 27, 1979

[54] ASSEMBLY STRUCTURE OF TENON AND MORTISE

[76] Inventor: Shui-Shan Cheng, No. 29 Ta She Rd., Lu Chu Kaohsiung, Taiwan

[21] Appl. No.: 912,968

[22] Filed: Jun. 6, 1978

[51] Int. Cl.² .............................................. F16B 12/10
[52] U.S. Cl. ...................................... 403/353; 403/11; 403/381; 248/188
[58] Field of Search ................. 403/381, 331, 353, 11; 144/309 L; 248/188

[56] References Cited

U.S. PATENT DOCUMENTS

| | | | |
|---|---|---|---|
| 676,079 | 6/1901 | Pfeil | 403/381 |
| 2,369,930 | 2/1945 | Wagner, Sr. | 248/188 |
| 2,614,302 | 10/1952 | Johnson | 403/381 |
| 3,090,086 | 5/1963 | Fata | 403/381 |
| 4,019,298 | 4/1977 | Johnson | 403/381 |

FOREIGN PATENT DOCUMENTS 30547 8/1933 Netherlands ............................ 403/381

Primary Examiner—Andrew V. Kundrat
Attorney, Agent, or Firm—Holman & Stern

[57] ABSTRACT

A tenon and mortise are formed with a taper-dovetail shape. As the tenon is inserted into the mortise, because of the friction force between the contacting surfaces and the squeezing force of the taper, the tenon is fixed sturdily in the mortise and the tenon can be easily assembled or dismantled by a particular shaping of its outer surface.

3 Claims, 10 Drawing Figures

ASSEMBLY STRUCTURE OF TENON AND MORTISE

BACKGROUND OF THE INVENTION

The present invention relates to tenon and mortise joints. The conventional tenon and mortise are straight sided difficult to fasten and tend to become loose. If they are fastened by means of nails and glue, the joint is difficult to dismantle. Therefore, it is not convenient to pack and carry. Furthermore, there are wooden latches which can be dismantled easily but the structure is very complex and not appealing.

Having reviewed the above-mentioned defects, the present inventor has developed the present tenon and mortise joint.

SUMMARY OF THE INVENTION

The mortise, for example in the back surface of table, is formed with a taper-dovetail slot which allows the insertion of the tenon. The tenon is formed to a shape to fit the mortise, and has a curved rear surface so as to insert into the mortise easily. As the tenon is inserted into the mortise because of the friction force between the contacting surfaces and the squeezing force of the taper, the tenon thus is fitted sturdily in the mortise. If the direction of the force is opposite to the inserting direction of the tenon, it is dismantled easily and is convenient for carrying.

BRIEF DESCRIPTION OF THE DRAWINGS

In order that the invention may be more readily understood, an embodiment thereof will now be described by way of example, with reference to the accompanying drawings in which.

DESCRIPTION OF THE PREFERRED EMBODIMENT

Figure 1:
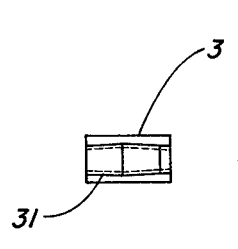
FIG. 1 is a top view of a support formed with a tenon.
Figure 2:
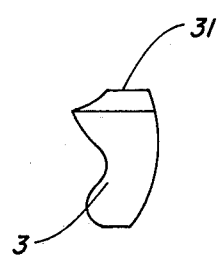
FIG. 2 is a front view of the support.

As shown in the drawings, the present tenon and mortise joint is formed between a table surface (1), and a support stand (3).

Figure 5:
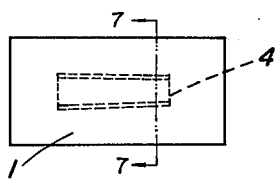
FIG. 5 is a top view of a table surface formed with a mortise-type groove.
Figure 6:
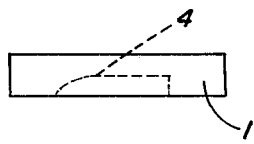
FIG. 6 is a front view of the table surface.
Figure 7:
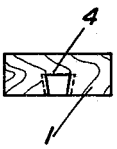
FIG. 7 is a right hand cross-sectional view of the table surface.

The table surface (1) is made of wooden materials. In the back surface of the table is formed a closed end groove or slot (4), forming the mortise. From a top view of table surface (1) in FIG. 5, the mortise (4) is a taper slot, that is, one end is smaller, while the other end is larger. Furthermore, from a side cross-sectional view of the table surface (1) in FIG. 7, the mortise (4) is a dovetail slot, that is, the upper end is larger, while the lower end is smaller. Owing to the taper slot, as the tenon (31) is inserted; the more it is pressed toward the smaller end, the sturdier it is fastened. Hence, tenon (31) will be fastened more sturdily in the taper-dovetail slot (4).

Figure 3:
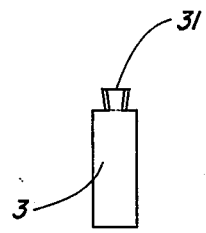
FIG. 3 is a right side view of the support.
Figure 4:
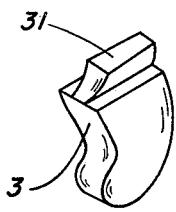
FIG. 4 is a perspective view of the support.

Support stand (3) is made of wooden materials. The upper end of support stand (3) is formed with a taper-dovetail projection forming a tenon (31). From a top view of the support stand (3) in FIG. 1, the tenon (31) is of a taper shape, that is the central section is wider than the ends. From a side view of the support stand (3) in FIG. 3, tenon (31) is of a dovetail shape, that is, the sides walls taper outwardly towards the outer surface.

Figure 8:
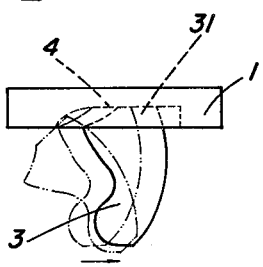
FIG. 8 is a front view of the tenon and mortise after being fixed.
Figure 9:
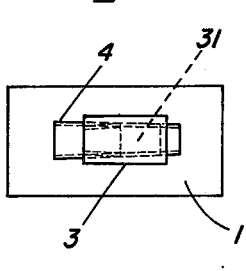
FIG. 9 is an underneath view of the of tenon and mortise after being fiexed.
Figure 10:
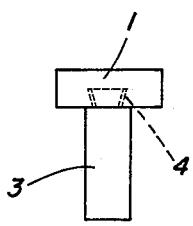
FIG. 10 is a side view of the tenon and mortise after being fixed.

Further, the upper surface of the tenon is divided lengthwise into a flat first portion and a second portion which is slightly concave and which inclines downwardly towards the end of the tenon. This facilitates insertion of the tenon into a slot of limited length in the manner illustrated in FIG. 8 in broken lines.

What is claimed is:

1. For use in forming a tenon and mortise-type joint structure, an element having a projection defining a tenon of dovetail form comprising side walls tapering outwardly from a surface of said element towards an outer surface of the tenon, said tenon further tapering lengthwise from a cross section of maximum dimension located at a central section of the tenon to a cross section of lesser dimension at one end of the tenon and said outer surface of the tenon including a first portion extending from said central portion of the tenon to said one end of the tenon and a second portion extending from said central section of the tenon to said other end of the tenon, said first portion being substantially parallel to said surface of the element and said second portion being inclined downardly from said central section of the tenon towards the other end of the tenon, said second portion of the outer surface facilitating insertion of the tenon into a closed-end mortise-type groove of complementary shape to the tenon but of limited length.

2. The element as defined in claim 1 wherein the tenon further tapers lengthwise from said cross section of maximum dimension to a cross section of lesser dimension at said other end of the tenon.

3. The element as defined in claim 2 wherein said second portion of said outer surface of the tenon has a concave form lengthwise of the tenon.

* * * * *